3,080,413
POLYCYANOCYCLOBUTANES CONTAINING ARYL SUBSTITUENTS AND METHOD FOR PREPARING SAME
Saul Winstein, Los Angeles, Calif., assignor to E. I. du Pont de Nemours and Company, Wilmington, Del., a corporation of Delaware
No Drawing. Filed Jan. 22, 1960, Ser. No. 4,004
7 Claims. (Cl. 260—465)

This invention is concerned with a new class of chemical compounds, and more particularly with polycyanocyclobutanes.

Blomquist and Meinwald, J. Am. Chem. Soc. 79, 5316 (1957) and Abstracts of Papers, 133rd Meeting of A.C.S., San Francisco, 77N (1958) describe the cycloaddition of tetracyanoethylene to the conjugated triene, 3,4-dimethylene-1,2-diphenylcyclobutene, and the conjugated diene, 1,2-diphenyl-4-methyl-3-methylenecyclobutene, to yield the 3-methylene and 3-methyl derivatives of 1,2-diphenyl-5,5,6,6-tetracyanospiro - [3.3]-1-heptene, respectively.

There has now been discovered a new class of polycyanocyclobutanes, viz., the 1,2,2-tricyanocyclobutanes and 1,1,2,2-tetracyanocyclobutanes, having at least one electron-donating group with its bond stemming from a carbon atom of an aromatic ring, said group being attached to one of the remaining cyclobutane ring carbon atoms. The invention also embraces the process for preparing these compounds by the reaction of tricyanoethylene or tetracyanoethylene with a monoolefin having attached to an olefinic carbon atom at least one electron-donating group with its bond stemming from a carbon atom of an aromatic ring.

The process and products of this invention may be more particularly illustrated by the following equation:

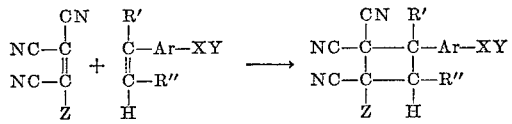

in which Ar is arylene; X is O, S, or NR; Y is hydrocarbyl; Z is H or CN; R is hydrocarbyl; and R' and R'' are hydrogen or hydrocarbyl. The reactants in the process of this invention are monoolefins, and thus all of the hydrocarbyl and substituted hydrocarbyl terms shown above are limited to those in which the hydrocarbyl moiety is free of aliphatic carbon-to-carbon unsaturation.

A distinguishing feature of this invention is the unpredictable ease with which the two particular classes of olefinic compounds, indicated above, react to form the product cyclobutanes. The reaction takes place readily at room temperature or below. Cooling is frequently desirable to dissipate the evolved heat, and good yields of product are obtained in a short time. This is in sharp contrast, for example, with the cycloaddition process of Barrick U.S. 2,462,345 where both heat and the presence of a polymerization inhibitor are required to insure the formation of a cyclobutane.

The reaction of this invention takes place simply on bringing the two unsaturated reactants into intimate contact at ordinary temperature. No additives or special conditions are essential. Because of the exothermic nature of the reaction, it is convenient to employ a diluent which is inert to the reactants and products to aid in dissipating the heat of reaction. The approach of the end of the reaction is readily observed by the reduction in the amount of heat given off.

Pressure is not a critical factor in this process. Pressures both above and below atmospheric pressure are operable, and atmospheric pressure is preferred for reasons of economy.

The proportion in which the two reactants are brought together is not limited in any way. For example, molar ratios ranging from 19:1 to 1:19 may be employed. However, the two reactants combine on an equimolar basis to form the cyclobutane product. Highest yields are, therefore, obtained when approximately equimolar quantities of the two reactants are employed.

Except for the limitation of being free from aliphatic carbon-to-carbon unsaturation, the term "hydrocarbyl," used in defining the products and process of this invention, means any monovalent organic radical composed solely of carbon and hydrogen. It is used in its full generic sense. The wide variation in the hydrocarbyl groups used in the illustrations which follow makes it evident that all hydrocarbyl groups free of aliphatic unsaturation are operable. Hydrocarbyl groups of this type may vary as to whether they are alkyl, cycloalkyl, aryl, aralkyl, single ring, multi ring, straight chain, branched chain, large, small, and the like. The widest variation of this sort does not in any way detract from the fundamental characteristic of the aliphatically saturated hydrocarbyl radical of passing unchanged through the process of this invention and exercising no effect whatever on the chemical steps of the process.

The limitations of space for disclosure are not to be construed as any limitation within the scope of "hydrocarbyl" contemplated in this invention. Even the most cumbersome saturated hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that saturated hydrocarbyl groups containing 20 or fewer carbon atoms are most available, and to that extent preferred. But there is to be no question of the operability of, or of the intent to include and disclose, any hydrocarbyl group whatsoever, as long as it is free of aliphatic carbon-to-carbon unsaturation. Except for factors of bulk and dilution, wide variations in size and structure of these hydrocarbyl radicals have no effect on the essential chemical nature of the cyclobutanes to which they are attached. All cyclobutanes of this invention obtainable by variation of hydrocarbyl groups within the above definitions are hereby disclosed. Disclosure of each and every possible hydrocarbyl embodiment is superfluous. The term "hydrocarbyl" is preferred over the synonymous term "hydrocarbon radical."

The term "arylene" is used in its generic sense to mean any divalent aromatic radical. It is of the essence of an arylene radical that the two bonds stem from different ring carbon atoms. Among arylene radicals are included those from which the corresponding aromatic compound obtained by placing hydrogens at the respective bonds of the arylene group has a resonance energy of not less than 20 kcal./mole. Resonance energies of organic compounds and the determination of resonance energies are shown by Linus Pauling in "The Nature of the Chemical Bond," second edition, Cornell University Press, 1945, pages 132–139.

Arlyene groups particularly suitable in the compounds of this invention include the hydrocarbon arylene groups such as phenylene, naphthylene, and anthrylene.

In the following examples, parts are by weight except as otherwise indicated. Example I represents a preferred embodiment.

EXAMPLE I

To a solution of 205 parts of tetracyanoethylene in 1421 parts of tetrahydrofuran is added 260 parts of anethole. The solution immediately turns deep blue in color. After six hours at room temperature, the blue color has faded, indicating completion of the reaction. Tetrahydrofuran is removed by vacuum distillation at room temperature. The residue, a viscous oil, is taken up in 644 parts of boiling 95% ethanol. The solution is cooled and a crystalline precipitate of 397 parts of 3-(p-methoxyphenyl)-4-methyl-1,1,2,2-tetracyanocyclobutane in the form of a colorless solid melting at 135–136° C. is obtained. The infrared absorption spectrum shows bands at 4.45 microns (unconjugated C≡N), 6.17 microns and 6.57 microns (phenyl), and 11.85 microns (p-disubstituted benzene). The proton nuclear magnetic resonance spectrum on a scale where $H_2O$ is O shows a quadruplet at +78 c.p.s. (p-disubstituted phenyl), a doublet at −143 c.p.s. (methyl split by adjacent hydrogen), and a peak at −49 c.p.s. ($OCH_3$).

*Analysis.*—Calcd. for $C_{16}H_{12}N_4O$: C, 69.55; H, 4.38; N, 20.28. Found: C, 69.71; H, 4.53; N, 20.87.

EXAMPLE II

To a solution of 450 parts of tetracyanoethylene in 1776 parts of tetrahydrofuran at 0° C. is added 497 parts of p-methoxystyrene. The deep blue color which forms immediately upon mixing fades to gray, and a solid precipitate starts to form within about ten minutes. After 30 minutes, the cold solution is diluted with 3300 parts of petroleum ether and stirred at 0° C. for another 15 minutes. The solid precipitate is collected by filtration and washed with petroleum ether. The crude material weighs 830 parts. It is recrystallized two times from 1,2-dichloroethane to yield 3-(p-methoxyphenyl)-1,1,2,2-tetracyanocyclobutane, melting at 182–183° C. The infrared absorption spectrum of this product shows bands at 4.44 microns (—CN), 6.23, 6.32, and 6.58 microns (benzene ring), 7.95 microns (C—O—aryl), and 11.98 microns (p-disubstituted benzene).

*Analysis.*—Calcd. for $C_{15}H_{10}N_4O$: C, 68.68; H, 3.85; N, 21.36. Found: C, 68.64; H, 3.90; N, 21.48.

EXAMPLE III

To a solution of 38 parts of tetracyanoethylene in 133 parts of tetrahydrofuran is added 49 parts of 2-(p-methoxyphenyl)propene. The solution immediately turns deep blue in color and the temperature approaches the boiling point, due to the exothermic heat of reaction. Within a few minutes the blue color fades, and the reaction mixture is cooled at 5° C. for 18 hours. The resulting dark brown solution, containing a crystalline deposit, is diluted with 660 parts of petroleum ether, and 57 parts of a crystalline product, melting at 145–148° C., is collected by filtration. It is recrystallized first from 1:6 methyl ethyl ketone:methanol and then two times from a 1:3 mixture of the same solvents to yield 3-(p-methoxyphenyl)-3-methyl-1,1,2,2-tetracyanocyclobutane as a crystalline solid melting with decomposition at 148–150° C. The infrared absorption spectrum shows bands at 4.43 microns (—CN), 6.17, 6.30, and 6.58 microns (benzene ring), 7.20 microns (C—$CH_3$), 7.97 microns ($CH_3$—O—aryl), and 12.0 microns (p-disubstituted benzene).

*Analysis.*—Calcd. for $C_{16}H_{12}N_4O$: C, 69.55; H, 4.38. Found: C, 69.66; H, 4.52.

EXAMPLE IV

To a solution of 38 parts of tetracyanoethylene in 133 parts of tetrahydrofuran is added 53 parts of 2-(p-methoxyphenyl)butene-2. The solution immediately turns deep blue in color and becomes warm, due to the exothermic heat of reaction. It is cooled to 5° C. and stirred for 18 hours, after which time 660 parts of petroleum ether is added. After storage for an additional hour at 25° C. followed by 30 minutes at 0° C., the crystalline solid which has deposited is collected by filtration and washed with petroleum ether. Recrystallization from absolute ethanol yields 39 parts of 3,4-dimethyl-3-(p-methoxyphenyl)-1,1,2,2-tetracyanocyclobutane in the form of white crystals, melting with decomposition at 131–133° C. The infrared absorption spectrum shows bands at 4.43 microns (—CN), 6.19, 6.30, and 6.69 microns (benzene ring), 7.17 and 7.20 microns (C—$CH_3$), 7.99 microns ($CH_3$—O—aryl), and 11.92 microns (p-disubstituted benzene).

*Analysis.*—Calcd. for $C_{17}H_{14}N_4O$: C, 70.33; H, 4.86. Found: C, 70.49; H, 5.06.

EXAMPLE V

A mixture of 148 parts of o-methoxyisopropenylbenzene, 128 parts of tetracyanoethylene, and 444 parts of tetrahydrofuran is allowed to stand at 20° C. for 16 hours. The resulting clear, purple solution is diluted by the addition of about 3½ volumes of petroleum ether. The product is obtained as a purple solid which is purified by recrystallization from 1,2-dichloroethane/hexane mixture using decolorizing carbon. The recrystallized material weighs 117 parts. It is further purified by recrystallization from 1,2-dichloroethane/hexane mixture followed by two recrystallizations from 1,2-dichloroethane/ether mixture to yield 3-(o-methoxyphenyl)-3-methyl-1,1,2,2-tetracyanocyclobutane melting at 162–162.5° C.

*Anal.*—Calcd. for $C_{16}H_{12}N_4O$: C, 69.55; H, 4.38; N, 20.28. Found: C, 69.73; H, 4.41; N, 20.00.

EXAMPLE VI

Part A

To a solution of 64 parts of tetracyanoethylene in 444 parts of tetrahydrofuran is added 80 parts of p-dimethylaminoisopropenylbenzene. The solution turns deep blue and becomes slightly warm. After three minutes, the blue color fades to green. After five minutes, the reaction mixture is diluted with 1075 parts of ether to precipitate 3-(p-dimethylaminophenyl)-3-methyl-1,1,2,2-tetracyanocyclobutane in the form of a crystalline solid which is collected by filtration and washed with ether. It weighs 78 parts.

Part B

3 - (p - dimethylaminophenyl) - 3 - methyl - 1,1,2,2 - tetracyanocyclobutane in the form of a crystalline solid several days. During this time it slowly evolves hydrogen cyanide and at the end of three days it is converted spontaneously into the intensely blue compound 4-(p-dimethylaminophenyl) - 4 - methyl - 1,3 - butadiene - 1,1,2 - tricarbonitrile.

When the unsaturated compounds tabulated below are substituted for the p-methoxystyrene in Example II, the indicated 1,1,2,2-tetracyanocyclobutane products are obtained.

TABLE

| Substituted Arylolefinic Compound | 1,1,2,2-Tetracyanocyclobutane Product |
|---|---|
| o-methoxystyrene | 3-(o-methoxyphenyl)-1,1,2,2-tetracyanocyclobutane. |
| m-methoxystyrene | 3-(m-methoxyphenyl)-1,1,2,2-tetracyanocyclobutane. |
| p-phenoxystyrene | 3-(p-phenoxyphenyl)-1,1,2,2-tetracyanocyclobutane. |
| p-ethoxystyrene | 3-(p-ethoxyphenyl)-1,1,2,2-tetracyanocyclobutane. |
| 4-methoxystilbene | 3-(p-methoxyphenyl)-4-phenyl-1,1,2,2-tetracyanocyclobutane. |
| p-N,N-dimethylaminostyrene | 3-(p-N,N-dimethylaminophenyl)-1,1,2,2-tetracyanocyclobutane. |
| 4-N,N-dimethylaminostilbene | 3-(p-N,N-dimethylaminophenyl)-4-phenyl-1,1,2,2-tetracyanocyclobutane. |
| p-methylthiostyrene | 3-(p-methylthiophenyl)-1,1,2,2-tetracyanocyclobutane. |
| p-phenylthiostyrene | 3-(p-phenylthiophenyl)-1,1,2,2-tetracyanocyclobutane. |
| β-vinyl-α,α'-dinaphthyl sulfide | 3-(α-[α-naphthylthio]-α-naphthyl)-1,1,2,2-tetracyanocyclobutane. |
| 4-ethoxy-1-propenylnaphthalene | 3-(4-ethoxy-1-naphthyl)-4-methyl-1,1,2,2-tetracyanocyclobutane. |

Tricyanoethylene may be used interchangeably with tetracyanoethylene in the preceding examples and in the reactions shown in the table to prepare the corresponding 1,2,2-tricyanocyclobutanes. Thus, tricyanoethylene reacts with p-phenoxystyrene to yield 3-(p-phenoxyphenyl)-1,2,2-tricyanocyclobutane; with p-N,N-dimethylaminostyrene to yield 3-(p-N,N-dimethylaminophenyl)-1,2,2-tricyanocyclobutane; with p-phenylthiostyrene to yield 3-(p-phenylthiophenyl)-1,2,2-tricyanocyclobutane, etc.

The cyclobutanes of the present invention in which X is NR are useful for preparing members of a known class of dyes. When these cyclobutanes are heated, particularly in the presence of an alkanol such as methanol or ethanol, or in some instances when they are stored for long periods of time, even at room temperature, the cyclobutane ring is opened and there is formed a member of the class of 4-aminoaryl-1,3-butadiene-2-carbonitriles. These compounds are known to be dyes as shown, for example, in U.S. 2,798,881. The process of forming members of the above class of dyes from the cyclobutanes of the present invention may be illustrated generically as follows:

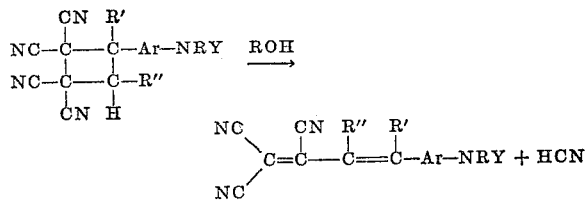

where Ar, Y, and the R's are as defined previously.

This type of conversion, even in the absence of an alkanol, is shown in detail in Part B of Example VII.

The use of the resulting aminoaryl butadienes as dyes is further illustrated as follows. A dyebath is prepared by adding a solution of 4 parts of 4-(p-dimethylaminophenyl) - 4 - methyl - 1,3 - butadiene - 1,1,2 - tricarbonitrile in 392 parts of acetonitrile to 40,000 parts of water containing 4 parts of a sulfonated lignin dispersant. Fabric swatches of cellulose acetate, nylon, silk, and wool are added and the dyebath is heated at 60–80° C. for 15 minutes. The fabrics are rinsed and dried and found to be dyed as follows: cellulose acetate is dyed blue; nylon is dyed grey-purple; silk is dyed grey-brown; and wool is dyed brown.

The 1,2,2-tricyanocyclobutanes and 1,1,2,2-tetracyanocyclobutanes of this invention are all useful as sources of hydrogen cyanide for fumigation and insect extermination purposes. This may be illustrated as follows:

A fumigation generator is charged with 5 parts of 3-(p - methoxyphenyl) - 1,1,2,2 - tetracyanocyclobutane, 95 parts of dimethylformamide, and 10 parts of water. Heat is applied to boil the mixture and copious fumes of hydrogen cyanide are given off. The presence of hydrogen cyanide in the fumes is confirmed by chemical test. Even after the generator has cooled to room temperature, insects exposed to the vapors from the generator are killed in less than 3 minutes.

Similar results are obtained when 3-(p-methoxyphenyl)-4-methyl-1,1,2,2-tetracyanocyclobutane is heated in 95% ethanol in a fumigation procedure similar to that described above. The corresponding 1,2,2-tricyanocyclobutanes are likewise effective in this use.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds represented by the formula

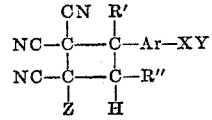

wherein Ar is arylene; X is a member of the class consisting of O, S and NR; Y is hydrocarbyl; Z is a member of the class consisting of hydrogen and cyano; R is hydrocarbyl; and R' and R" are members of the class consisting of hydrogen and hydrocarbyl; with the provisos that each hydrocarbyl radical is free of aliphatic carbon-to-carbon unsaturation and contains up to and including 20 carbon atoms.

2. 3 - (p - methoxyphenyl) - 4 - methyl - 1,1,2,2-tetracyanocyclobutane.

3. 3 - (p - methoxyphenyl) - 1,1,2,2 - tetracyanocyclobutane.

4. 3 - (p - methoxyphenyl) - 3 - methyl - 1,1,2,2 - tetracyanocyclobutane.

5. 3,4 - dimethyl - 3 - (p-methoxyphenyl)-1,1,2,2-tetracyanocyclobutane.

6. 3 - (p-dimethylaminophenyl) - 3 - methyl - 1,1,2,2-tetracyanocyclobutane.

7. Process which comprises reacting a polycyanoethylene of the formula.

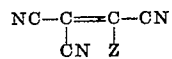

wherein Z is a member of the class consisting of hydrogen and cyano, with a monoolefin of the formula

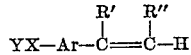

wherein Ar is arylene; X is a member of the class consisting of O, S and NR; Y is hydrocarbyl; R is hydrocarbyl; and R' and R" are members of the class consisting of hydrogen and hydrocarbyl; with the provisos that each hydrocarbyl radical is free of aliphatic carbon-to-carbon unsaturation and contains up to and including 20 carbon atoms, and isolating the resultant polycyanocyclobutane.

References Cited in the file of this patent

Blomquist et al.: J.A.C.S., 79, (1957) p. 5316.
Blomquist et al.: J.A.C.S., 79, (1957), p. 5317.
Blomquist et al.: Abstracts of Papers, 133rd Meeting of A.C.S., p. 77 N (1958).
(Copies of above in Scientific Library.)